US012794209B2

(12) United States Patent
Aizawa

(10) Patent No.: US 12,794,209 B2
(45) Date of Patent: Nov. 10, 2026

(54) IN-VEHICLE CUTOFF CURRENT SUPPLY DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kiyoshi Aizawa, Yokkaichi (JP)

(73) Assignees: AutoNetworks Technologies, Ltd., Yokkaichi (JP); Sumitomo Wiing Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 19/149,174

(22) PCT Filed: Jan. 19, 2023

(86) PCT No.: PCT/JP2023/001470

§ 371 (c)(1),
(2) Date: Jul. 18, 2025

(87) PCT Pub. No.: WO2024/154286

PCT Pub. Date: Jul. 25, 2024

(65) Prior Publication Data

US 2026/0221750 A1 Jul. 30, 2026

(51) Int. Cl.
*H02H 3/02* (2006.01)
*B60R 16/033* (2006.01)
(Continued)

(52) U.S. Cl.
CPC ........... *H02H 3/025* (2013.01); *B60R 16/033* (2013.01); *H02H 3/08* (2013.01); *H02M 3/156* (2013.01); *B60L 3/04* (2013.01)

(58) Field of Classification Search
CPC ..................................................... H02H 3/025
(Continued)

(56) References Cited

U.S. PATENT DOCUMENTS 6,333,568 B1 * 12/2001 Bitsche .................. B60L 15/20 307/121
2005/0264268 A1 12/2005 Ueno
(Continued)

FOREIGN PATENT DOCUMENTS

JP 2005-088748 A 4/2005

OTHER PUBLICATIONS

International Search Report, Application No. PCT/JP2023/001470, mailed Apr. 4, 2023. ISA/Japan Patent Office.

*Primary Examiner* — Joseph Chang
(74) *Attorney, Agent, or Firm* — Brooks Kushman P.C.

(57) ABSTRACT

A voltage conversion unit converts a voltage input from a power supply unit side and applies an output voltage between first and second conductive paths. A control unit performs feedback control to control the voltage conversion unit so that the output voltage matches a target voltage. A drive unit causes current from the first conductive path to flow toward a current input unit when a cutoff condition is met. A current limiting unit limits current flowing from the power supply unit side to the voltage conversion unit side. The parallel switch is provided in parallel with the current limiting unit. The control unit starts the feedback control in a state where the cutoff condition is not met. When the cutoff condition is met, the parallel switch switches to an on state, and current flows from the power supply unit side to the voltage conversion unit side via the parallel switch.

11 Claims, 1 Drawing Sheet

(51) Int. Cl.
*H02H 3/08* (2006.01)
*H02M 3/156* (2006.01)
*B60L 3/04* (2006.01)

(58) Field of Classification Search
USPC ........................................................... 307/9.1
See application file for complete search history.

(56) References Cited

U.S. PATENT DOCUMENTS

| | | | | |
|---|---|---|---|---|
| 2021/0304974 | A1 | 9/2021 | Kanematsu et al. | |
| 2022/0250481 | A1* | 8/2022 | Hirobe .................... | B60L 15/06 |
| 2024/0246420 | A1 | 7/2024 | Iwaki et al. | |

* cited by examiner

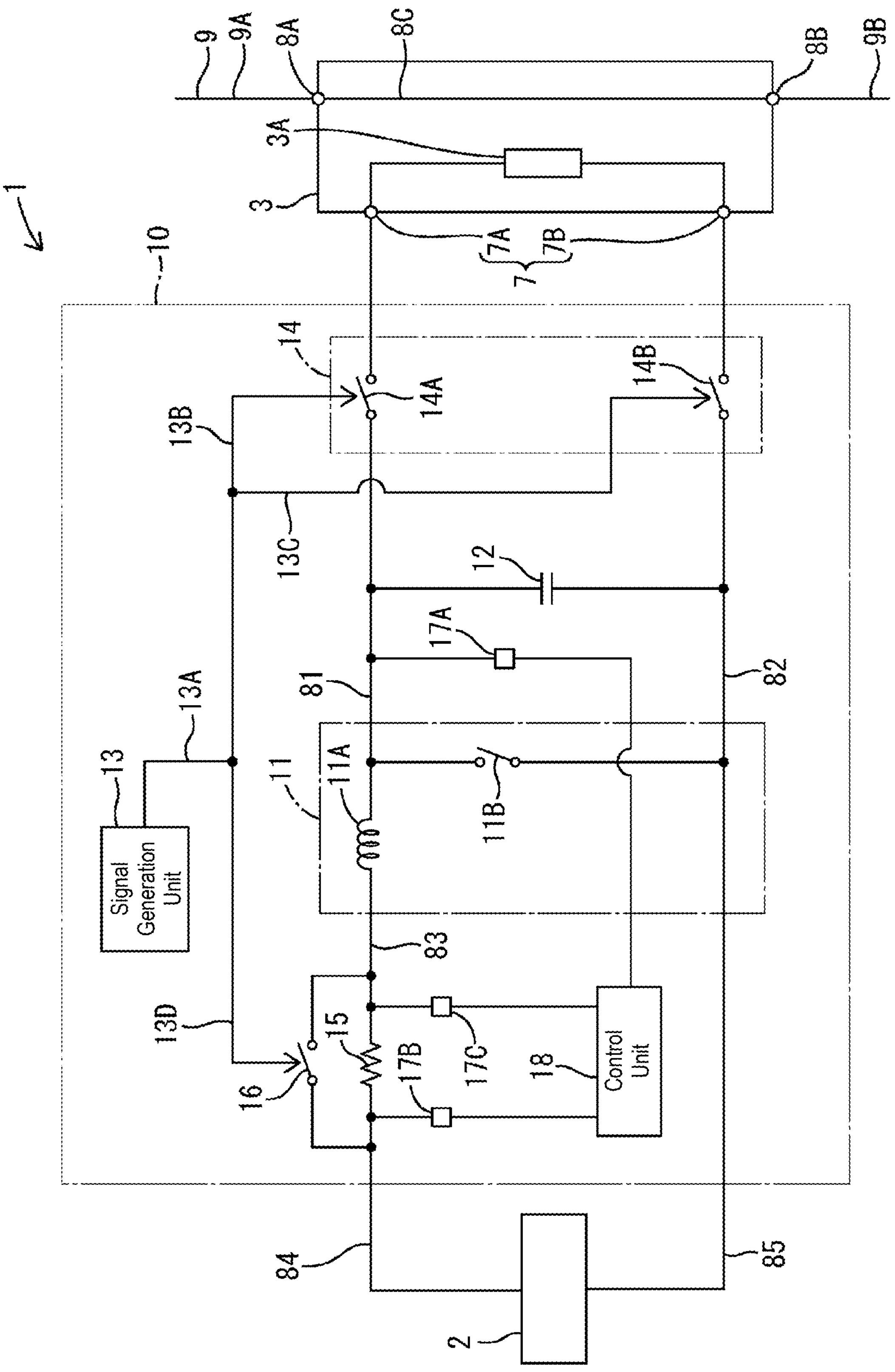
Signal Generation Unit
Control Unit

IN-VEHICLE CUTOFF CURRENT SUPPLY DEVICE

CROSS-REFERENCE TO RELATED APPLICATIONS

This application is the U.S. national stage of PCT/JP2023/001470 filed on Jan. 19, 2023, the contents of which is incorporated herein.

TECHNICAL FIELD

The present disclosure relates to an in-vehicle cutoff current supply device.

BACKGROUND

JP 2005-88748A discloses an airbag ignition circuit. This airbag ignition circuit includes a sense MOS that is connected between a power source and a squib and turns on in response to an ignition signal. When the sense MOS is turned on, an ignition current flows through the squib, causing the squib to ignite and explode, which in turn deploys the airbag with the resulting force.

The technology according to JP 2005-88748A can be applied to a configuration that uses a cutoff device, such as a pyrofuse (registered trademark), to interrupt a power path. For the cutoff device to perform a cutoff operation, the integrated value of the current supplied to the cutoff device needs to reach a certain level. However, immediately after the sense MOS switches to the on state, the output voltage drops, which reduces the current supplied to the cutoff device, potentially delaying the cutoff operation of the cutoff device.

The present disclosure aims to provide a technology that facilitates rapid performance of the cutoff operation by the cutoff device.

SUMMARY

An in-vehicle cutoff current supply device according to the present disclosure is an in-vehicle cutoff current supply device that is to be used in an in-vehicle system including a power supply unit and a cutoff device that performs a cutoff operation to interrupt a power path in response to current flowing into a current input unit, the in-vehicle cutoff current supply device causing current supplied from the power supply unit to flow toward the current input unit when a cutoff condition is met, the in-vehicle cutoff current supply device including: a voltage conversion unit that converts a voltage input from the power supply unit side and applies an output voltage between a first conductive path and a second conductive path; a control unit that performs feedback control to control the voltage conversion unit so that the output voltage matches a target voltage; a drive unit that causes current supplied from the first conductive path to flow toward the current input unit when the cutoff condition is met; a current limiting unit that is provided between the power supply unit and the voltage conversion unit and limits current flowing from the power supply unit side to the voltage conversion unit side; and a parallel switch that is provided in parallel with the current limiting unit, wherein the control unit starts the feedback control in a state where the cutoff condition is not met, and when the cutoff condition is met, the parallel switch switches to an on state, and current flows from the power supply unit side to the voltage conversion unit side via the parallel switch.

Advantageous Effects

The technology according to the present disclosure facilitates rapid performance of the cutoff operation by the cutoff device.

BRIEF DESCRIPTION OF DRAWINGS

FIG. 1 is a circuit diagram schematically showing an in-vehicle system including an in-vehicle cutoff current supply device according to a first embodiment.

DETAILED DESCRIPTION OF PREFERRED EMBODIMENTS

In the following, embodiments according to the present disclosure are listed and exemplified.

In a first aspect, an in-vehicle cutoff current supply device that is to be used in an in-vehicle system including a power supply unit and a cutoff device that performs a cutoff operation to interrupt a power path in response to current flowing into a current input unit, the in-vehicle cutoff current supply device causing current supplied from the power supply unit to flow toward the current input unit when a cutoff condition is met, the in-vehicle cutoff current supply device including: a voltage conversion unit that converts a voltage input from the power supply unit side and applies an output voltage between a first conductive path and a second conductive path; a control unit that performs feedback control to control the voltage conversion unit so that the output voltage matches a target voltage; a drive unit that causes current supplied from the first conductive path to flow toward the current input unit when the cutoff condition is met; a current limiting unit that is provided between the power supply unit and the voltage conversion unit and limits current flowing from the power supply unit side to the voltage conversion unit side; and a parallel switch that is provided in parallel with the current limiting unit, wherein the control unit starts the feedback control in a state where the cutoff condition is not met, and when the cutoff condition is met, the parallel switch switches to an on state, and current flows from the power supply unit side to the voltage conversion unit side via the parallel switch.

The above in-vehicle cutoff current supply device starts the feedback control by the control unit before the cutoff condition is met, and causes current to flow from the first conductive path toward the current input unit of the cutoff device when the cutoff condition is met. Therefore, the above in-vehicle cutoff current supply device can immediately cause the current supplied from the voltage conversion unit to flow toward the current input unit of the cutoff device when the cutoff condition is met.

Furthermore, the above in-vehicle cutoff current supply device can enable the current limiting unit to limit the current flowing from the power supply unit side to the voltage conversion unit side, while allowing current to flow from the power supply unit side to the voltage conversion unit side via the parallel switch when the cutoff condition is met. Therefore, in the above in-vehicle cutoff current supply device, when the cutoff condition is met, the current input from the power supply unit side to the voltage conversion unit increases, and the current output from the voltage conversion unit to the first conductive path increases. Therefore, the above in-vehicle cutoff current supply device can suppress a decrease in the output voltage of the voltage conversion unit and a decrease in the current flowing to the current input unit when the cutoff condition is met. As a result, the cutoff operation by the cutoff device is performed quickly.

Also, if the parallel switch is kept in the on state before the cutoff condition is met, it becomes necessary to use elements with high current resistance as elements constituting the drive unit and so on, which raises concerns about increasing costs. In contrast, the above in-vehicle cutoff current supply device switches the parallel switch to the on state after the cutoff condition is met, and therefore such a problem of increasing costs is unlikely to occur.

In a second aspect, the in-vehicle cutoff current supply device according to the first aspect, further including: a signal generation unit that outputs an instruction signal when the cutoff condition is met, wherein the instruction signal output from the signal generation unit is supplied to the drive unit and the parallel switch, the drive unit supplies the current supplied from the first conductive path toward the current input unit when the instruction signal is supplied, and the parallel switch switches to the on state when the instruction signal is supplied.

If the drive unit and the parallel switch operate based on the results of the cutoff condition determined by separate determination means, issues such as the parallel switch not operating even when the drive unit operates or a timing mismatch between the operations of the drive unit and the parallel switch may occur. In contrast, in the above in-vehicle cutoff current supply device, the drive unit and the parallel switch both operate in response to the instruction signal from the signal generation unit. Therefore, the above in-vehicle cutoff current supply device can more reliably switch the parallel switch to the on state and increase the output current from the voltage conversion unit when causing current to flow from the drive unit toward the current input unit in response to the cutoff condition being met.

In a third aspect, the in-vehicle cutoff current supply device according to the first or the second aspect, wherein when a predetermined start condition is met, the in-vehicle cutoff current supply device enters a first state in which the parallel switch is in an off state and the control unit performs the feedback control, and when the cutoff condition is met in the first state, the in-vehicle cutoff current supply device enters a second state in which the parallel switch is in the on state.

In the first state, the above in-vehicle cutoff current supply device can more reliably limit the current flowing from the power supply unit side to the voltage conversion unit side using the current limiting unit. When the cutoff condition is met, the above in-vehicle cutoff current supply device can switch the parallel switch to the on state to increase the output current from the voltage conversion unit.

In a fourth aspect, the in-vehicle cutoff current supply device according to the third aspect, wherein, in the first state, the control unit performs current suppression control to lower the output voltage of the voltage conversion unit when current flowing through the current limiting unit exceeds a threshold value, whereas, in the second state, the control unit does not perform the current suppression control even when the current flowing through the current limiting unit exceeds the threshold value.

In the first state, the above in-vehicle cutoff current supply device can suppress the output current from the voltage conversion unit when the current flowing through the current limiting unit exceeds a threshold value. On the other hand, in the second state, the above in-vehicle cutoff current supply device does not perform current suppression control even when the current flowing through the current limiting unit exceeds the threshold value, thereby increasing the output current from the voltage conversion unit to enable the cutoff device to perform the cutoff operation quickly.

In a fifth aspect, the in-vehicle cutoff current supply device according to any one of the first through the fourth aspects, further including: a capacitor with one end electrically connected to the first conductive path and the other end electrically connected to the second conductive path.

The above in-vehicle cutoff current supply device can cause current to flow from the voltage conversion unit to the capacitor and charge the capacitor in a state before the cutoff condition is met. When the cutoff condition is met, the current from the capacitor flows toward the current input unit via the first conductive path and the drive unit. In other words, the above in-vehicle cutoff current supply device can quickly cause the cutoff device to perform the cutoff operation using the current from the capacitor and the current from the voltage conversion unit when the cutoff condition is met. Moreover, since the output current from the voltage conversion unit increases when the cutoff condition is met, the above in-vehicle cutoff current supply device can cause the cutoff device to perform the cutoff operation even more quickly.

In a sixth aspect, the in-vehicle cutoff current supply device according to any one of the first through the fifth aspects, wherein the current limiting unit is a resistor portion.

In the in-vehicle cutoff current supply device, the current limiting unit can be constituted by a resistor portion.

In a seventh aspect, the in-vehicle cutoff current supply device according to any one of the first through the sixth aspects, wherein, when the parallel switch is in the on state, one end of the current limiting unit is short-circuited to the other end thereof via the parallel switch.

In the in-vehicle cutoff current supply device, when the cutoff condition is met, the parallel switch switches to the on state and one end of the current limiting unit is short-circuited to the other end. For this reason, when the cutoff condition is met, the above in-vehicle cutoff current supply device can sharply increase the current supplied from the power supply unit to the voltage conversion unit, and as a result, sharply increase the current supplied to the cutoff device.

Overview of In-Vehicle System 1

FIG. 1 shows an in-vehicle system 1 that includes an in-vehicle cutoff current supply device 10 according to a first embodiment. In the following description, the in-vehicle cutoff current supply device 10 is also referred to as a cutoff current supply device 10. The in-vehicle system 1 is a system to be mounted in a vehicle and is capable of supplying power to various loads. The vehicle in which the in-vehicle system 1 is mounted may be, for example, an electric vehicle, a plug-in hybrid vehicle, a hybrid vehicle, an engine vehicle, or the like, and may be any other type of vehicle.

The in-vehicle system 1 includes a power supply unit 2, a cutoff device 3, and the cutoff current supply device 10.

The power supply unit 2 is constituted, for example, by a battery. The battery may be constituted by a secondary battery such as a lead-acid battery or a lithium-ion battery, or by any other type of storage battery. The high-potential terminal of the battery is electrically connected to a fourth conductive path 84. The low-potential terminal of the battery is electrically connected to a fifth conductive path 85. The battery applies a predetermined DC voltage between the fourth conductive path 84 and the fifth conductive path 85 when fully charged.

The cutoff device 3 performs a cutoff operation to interrupt a power path 9 in response to current flowing into a current input unit 7. The power path 9 is a conductive path through which power is transmitted. The use of the power path 9 is not limited, but it can be formed, for example, as a conductive path that supplies power to an in-vehicle load. The power path 9 includes a first power path 9A connected to one side of the cutoff device 3 and a second power path 9B connected to the other side of the cutoff device 3. The first power path 9A and the second power path 9B are short-circuited to each other when the cutoff device 3 is in a conductive state and are insulated from each other when the cutoff device 3 is in a cutoff state. In FIG. 1, the connection destinations of the first power path 9A and the second power path 9B on the sides opposite the cutoff device 3 are omitted. The power path 9 is, for example, a conductive path to which a voltage higher than the voltage applied between a third conductive path 83 and the fourth conductive path 84 is applied.

The cutoff device 3 is formed as a pyrotechnic cutoff device. As the pyrotechnic cutoff device, a well-known explosive fuse such as a pyrofuse can be suitably used. The cutoff device 3 includes the current input unit 7, conductor portions 8A, 8B, and 8C, an igniter 3A, and a displacement portion (not shown). The current input unit 7 includes a first terminal portion 7A and a second terminal portion 7B. The current input unit 7 allows current to flow from the first terminal portion 7A to the second terminal portion 7B when a drive unit 14, which will be described later, is in an allowable state. The current input unit 7 is insulated from the power path 9. The conductor portion 8A is a terminal connected to the first power path 9A and short-circuited to the first power path 9A. The conductor portion 8B is a terminal connected to the second power path 9B and short-circuited to the second power path 9B. The conductor portion 8C is a conductor that short-circuits between the conductor portion 8A and the conductor portion 8B.

The igniter 3A is a portion that causes a small-scale explosion when current flows from the first terminal portion 7A to the second terminal portion 7B, functioning to move the displacement portion with this explosion. More specifically the igniter 3A causes a small-scale explosion when the integrated value of the current supplied to the igniter 3A (i.e., the current supplied to the current input unit 7) reaches a certain level, functioning to move the displacement portion with this explosion. The displacement portion is held at a predetermined position before an explosion occurs in the igniter 3A (when the conductor portions 8A, 8B, and 8C are short-circuited to each other), and when an explosion occurs in the igniter 3A, the displacement portion displaces toward the conductor portion 8C due to the explosion, functioning to cut and interrupt the conductor portion 8C.

Thus, the cutoff device 3 performs a cutoff operation to interrupt the power path 9 in response to current flowing into the current input unit 7. More specifically, the cutoff device 3 performs a cutoff operation to interrupt the power path 9 when the integrated value of the current supplied to the current input unit 7 reaches a certain level.

Configuration of Cutoff Current Supply Device 10

The cutoff current supply device 10 is a device that is to be used in the in-vehicle system 1 and causes the current supplied from the power supply unit 2 to flow toward the current input unit 7 when a cutoff condition is met. The cutoff condition may be, for example, that the value of the current flowing through the power path 9 exceeds a threshold current, that the voltage of the power path 9 falls to or below a threshold voltage, or any other condition.

The cutoff current supply device 10 includes a voltage conversion unit 11, a capacitor 12, a signal generation unit 13, the drive unit 14, a current limiting unit 15, a parallel switch 16, voltage detection circuits 17A, 17B, and 17C, and a control unit 18.

The voltage conversion unit 11 is provided between the power supply unit 2 and the drive unit 14. The voltage conversion unit 11 performs a conversion operation to convert a voltage input from the power supply unit 2 side and apply an output voltage between a first conductive path 81 and a second conductive path 82. The voltage input from the power supply unit 2 side refers to the voltage applied to the third conductive path 83. The voltage conversion unit 11 steps up or steps down the voltage input from the power supply unit 2 side and applies the output voltage between the first conductive path 81 and the second conductive path 82. The voltage conversion unit 11 causes the current from the power supply unit 2 to flow to the first conductive path 81. The voltage conversion unit 11 is a DC-DC converter. The DC-DC converter may be of a non-isolated type or an isolated type.

In the example shown in FIG. 1, the voltage conversion unit 11 is a step-up circuit that performs a step-up operation to step up the voltage input from the power supply unit 2 side and apply the output voltage between the first conductive path 81 and the second conductive path 82. More specifically the voltage conversion unit 11 is a non-isolated step-up converter. The voltage conversion unit 11 includes an inductor 11A and a switching element 11B. The switching element 11B is constituted by a FET (Field Effect Transistor) in this embodiment. Note that the switching element 11B may be constituted by a semiconductor switch other than a FET. The switching element 11B performs on-off operations in response to a control signal with a predetermined duty cycle being supplied to an input portion (specifically the gate). One end of the inductor 11A is electrically connected to the third conductive path 83. The other end of the inductor 11A is electrically connected to the first conductive path 81 and one end (specifically, the drain) of the switching element 11B. The other end (specifically the source) of the switching element 11B is electrically connected to the second conductive path 82 and the fifth conductive path 85. The voltage conversion unit 11 increases the output voltage as the duty cycle of the control signal supplied to the switching element 11B increases. The duty cycle refers to the ratio of the on-time to the period. The control signal is, for example, a PWM (Pulse Width Modulation) signal.

The capacitor 12 is provided between the voltage conversion unit 11 and the drive unit 14. One end of the capacitor 12 is electrically connected to the first conductive path 81. The other end of the capacitor 12 is electrically connected to the second conductive path 82. The capacitor 12 is charged by the current supplied from the voltage conversion unit 11 via the first conductive path 81 when the voltage conversion unit 11 performs the conversion operation.

The signal generation unit 13 outputs an instruction signal when the cutoff condition is met. The signal generation unit 13 determines whether or not the cutoff condition is met and outputs the instruction signal upon determining that the cutoff condition is met. The signal generation unit 13 may determine that the cutoff condition is met, for example, when the value of the current flowing through the power path 9 exceeds a threshold current or when the voltage of the power path 9 falls to or below a threshold voltage. The instruction signal is an on signal that switches drive switches 14A and 14B and the parallel switch 16 to an on state. The on signal is, for example, a high-level signal. The instruction signal is supplied to the drive unit 14 and the parallel switch 16.

The signal generation unit 13 applies an instruction signal to a common line 13A when the cutoff condition is met. The instruction signal is supplied to the drive unit 14 via first branch lines 13B and 13C branching from the common line 13A. The instruction signal is supplied to the parallel switch 16 via a second branch line 13D branching from the common line 13A.

Note that the signal generation unit 13 outputs a standby signal in a state where the cutoff condition is not met. The standby signal is an off signal that maintains the drive switches 14A and 14B and the parallel switch 16 in an off state. The off signal is, for example, a low-level signal. The standby signal is supplied to the drive unit 14 and the parallel switch 16.

The drive unit 14 is provided between the power supply unit 2 and the current input unit 7 of the cutoff device 3. The drive unit 14 is provided between the first conductive path 81 and the current input unit 7 of the cutoff device 3. The drive unit 14 causes the current supplied from the first conductive path 81 to flow toward the current input unit 7 when the cutoff condition is met. The drive unit 14 causes the current supplied from the first conductive path 81 to flow toward the current input unit 7 when the instruction signal is applied. The drive unit 14 switches between an allowable state in which the drive unit 14 allows current to flow from the first conductive path 81 side to the current input unit 7 side and a cutoff state in which the drive unit 14 interrupts the current flow from the first conductive path 81 side to the current input unit 7 side. The drive unit 14 is in the cutoff state before the cutoff condition is met and switches to the allowable state when the cutoff condition is met. The drive unit 14 switches to the allowable state when the instruction signal is applied. The drive unit 14 causes the current supplied from the first conductive path 81 to flow toward the current input unit 7 by switching to the allowable state.

The drive unit 14 includes the drive switches 14A and 14B. Each of the drive switches 14A and 14B may be constituted by a semiconductor switch such as a FET (Field Effect Transistor) or by a mechanical switch with contacts. The drive switch 14A is provided between the first conductive path 81 and the first terminal portion 7A. One end of the drive switch 14A is electrically connected to the first conductive path 81. The other end of the drive switch 14A is electrically connected to the first terminal portion 7A. The drive switch 14B is provided between the second conductive path 82 and the second terminal portion 7B. One end of the drive switch 14B is electrically connected to the second conductive path 82. The other end of the drive switch 14B is electrically connected to the second terminal portion 7B. The drive switches 14A and 14B switch to an on state when the instruction signal is applied. When the drive switch 14A is in the on state, the first conductive path 81 is electrically connected to the first terminal portion 7A. When the drive switch 14B is in the on state, the second conductive path 82 is electrically connected to the second terminal portion 7B. The drive unit 14 causes the current supplied from the first conductive path 81 to flow toward the current input unit 7 when the instruction signal is supplied to the drive switches 14A and 14B. Note that the drive unit 14 is in the cutoff state when the drive switches 14A and 14B are in the off state and in the allowable state when the drive switches 14A and 14B are in the on state.

The current limiting unit 15 is provided between the power supply unit 2 and the voltage conversion unit 11, and limits the current flowing from the power supply unit 2 side to the voltage conversion unit 11 side. The current limiting unit 15 can, for example, suppress the flow of overcurrent to the drive unit 14 side (e.g., the capacitor 12) when the voltage conversion unit 11 starts operating. In this embodiment, the current limiting unit 15 is a resistor portion and is constituted by a resistor. One end of the current limiting unit 15 is electrically connected to the fourth conductive path 84 on the power supply unit 2 side. The other end of the current limiting unit 15 is electrically connected to the third conductive path 83. The current from the power supply unit 2 is supplied to the voltage conversion unit 11 via the fourth conductive path 84, the current limiting unit 15, and the third conductive path 83.

The parallel switch 16 is provided in parallel with the current limiting unit 15. One end of the parallel switch 16 is electrically connected to the fourth conductive path 84. One end of the parallel switch 16 is electrically connected to the high-potential terminal of the power supply unit 2 and to one end of the current limiting unit 15. The one end of the parallel switch 16 is short-circuited to the one end of the current limiting unit 15. The other end of the parallel switch 16 is electrically connected to the third conductive path 83. The other end of the parallel switch 16 is electrically connected to the other end of the current limiting unit 15 and the one end of the inductor 11A. The other end of the parallel switch 16 is short-circuited to the other end of the current limiting unit 15. The parallel switch 16 may be constituted by a semiconductor switch such as a FET (Field Effect Transistor) or by a mechanical switch with contacts. The parallel switch 16 switches to an on state when the instruction signal is supplied when the cutoff condition is met. When the parallel switch 16 is in the on state, current flows from the power supply unit 2 side to the voltage conversion unit 11 side via the parallel switch 16. When the parallel switch 16 is in the on state, the one end of the current limiting unit 15 is short-circuited to the other end via the parallel switch 16.

The voltage detection circuit 17A is a circuit that detects the output voltage of the voltage conversion unit 11. The voltage detection circuit 17A outputs a signal that can identify the output voltage of the voltage conversion unit 11 to the control unit 18. The voltage detection circuits 17B and 17C are circuits that detect the voltage across both ends of the current limiting unit 15. The voltage detection circuits 17B and 17C output a signal that can identify the voltage across both ends of the current limiting unit 15, to the control unit 18.

The control unit 18 controls the voltage conversion unit 11 (more specifically, the switching element 11B) by supplying a control signal (e.g., a PWM (Pulse Width Modulation) signal) to the voltage conversion unit 11 (more specifically the switching element 11B). The control unit 18 performs feedback control to control the voltage conversion unit 11 so that the output voltage matches a target voltage. The control unit 18 may be, for example, a general-purpose logic IC that performs the above feedback control, or may be constituted by a control circuit mainly including a microcomputer.

The control unit 18 starts the above feedback control in a state where the cutoff condition is not met. The state where the cutoff condition is not met refers to a state before the cutoff condition is met. The control unit 18 starts the feedback control when a start condition is met. The start condition may be, for example, that a vehicle start condition is met or any other condition. The control unit 18 may determine that the vehicle start condition is met when a start switch is switched to an on state. The start switch is, for example, an ignition switch, a power switch, or the like. The control unit 18 starts the above feedback control, for example, upon receiving an instruction from an external ECU (Electronic Control Unit) when the start condition is met.

The control unit 18 identifies the output voltage of the voltage conversion unit 11 based on the signal output from the voltage detection circuit 17A. In the above feedback control, the control unit 18 controls the voltage conversion unit 11 so that the output voltage matches the target voltage based on the identified output voltage. The control unit 18 determines the duty cycle based on, for example, the deviation between the output voltage identified from the signal of the voltage detection circuit 17A and the target voltage, and sets the determined duty cycle. In the above feedback control, the control unit 18 increases the duty cycle to be set, as the output voltage, identified from the signal of the voltage detection circuit 17A, decreases relative to the target voltage. The control unit 18 supplies a control signal with the set duty cycle to the switching element 11B.

When the above start condition is met, the cutoff current supply device 10 enters a first state in which the parallel switch 16 is in the off state and the control unit 18 performs the feedback control. When the cutoff condition is met in the first state, the cutoff current supply device 10 enters a second state in which the parallel switch 16 is in the on state. The control unit 18 determines that the cutoff current supply device 10 has entered the first state when the start condition is met. The control unit 18 determines that the cutoff current supply device 10 has entered the second state when the cutoff condition is met in the first state. The control unit 18 may determine whether or not the cutoff condition is met on its own or based on a signal output from the signal generation unit 13.

The control unit 18 identifies the value of the current flowing through the current limiting unit 15 based on the signals output from the voltage detection circuits 17B and 17C. In the first state, the control unit 18 performs current suppression control to lower the output voltage of the voltage conversion unit 11 when the current flowing through the current limiting unit 15 exceeds a threshold value, whereas, in the second state, the control unit 18 does not perform current suppression control even when the current flowing through the current limiting unit 15 exceeds the threshold value.

Examples of Operations of Cutoff Current Supply Device 10

The control unit 18 starts the above feedback control when the above start condition is met. This causes the voltage conversion unit 11 to start the above conversion operation. While the voltage conversion unit 11 is performing the conversion operation, current from the power supply unit 2 is supplied to the first conductive path 81 and the capacitor 12, thereby charging the capacitor 12. The output voltage of the voltage conversion unit 11 increases to approach the target voltage. When the output voltage of the voltage conversion unit 11 approaches the target voltage, it is held near the target voltage. A voltage corresponding to the output voltage of the voltage conversion unit 11 is applied to the one end of the drive switch 14A. The state where the capacitor 12 is fully charged and the output voltage of the voltage conversion unit 11 has approached the target voltage is a standby state waiting for the cutoff condition to be met. During this period, the control unit 18 continues the feedback control. Also, the parallel switch 16 is held in the off state from the time the start condition is met until the cutoff condition is met. That is to say, the cutoff current supply device 10 enters the first state when the start condition is met.

In the first state, the control unit 18 monitors the current flowing through the current limiting unit 15 and repeatedly determines whether or not the current has exceeded the threshold value. Upon determining that the current flowing through the current limiting unit 15 has exceeded the threshold value, the control unit 18 performs current suppression control to lower the output voltage of the voltage conversion unit 11. For example, in current suppression control, the control unit 18 lowers the output voltage of the voltage conversion unit 11 by lowering the target voltage. As another example, in current suppression control, the control unit 18 reduces the duty cycle of the control signal output from the voltage conversion unit 11.

When the cutoff condition is met in the first state, as described above, the cutoff current supply device 10 enters the second state. The signal generation unit 13 outputs an instruction signal when it is determined that the cutoff condition is met. The drive unit 14 switches to the allowable state when the instruction signal is supplied, thereby causing the current supplied from the first conductive path 81 to flow toward the current input unit 7. As a result, the current from the voltage conversion unit 11 and the current from the capacitor 12 flow toward the current input unit 7. Furthermore, the parallel switch 16 switches to the on state when the instruction signal is supplied. In the second state, current suppression control is not performed. Therefore, as described above, the input current to the voltage conversion unit 11 increases, the output current from the voltage conversion unit 11 increases, and the current supplied to the cutoff device 3 increases.

The current supplied to the current input unit 7 flows to the igniter 3A. The cutoff device 3 performs the above cutoff operation when the integrated value of the current flowing to the igniter 3A reaches a certain level.

Examples of Effects

The in-vehicle cutoff current supply device 10 starts the feedback control by the control unit 18 before the cutoff condition is met, and causes current to flow from the first conductive path 81 toward the current input unit 7 of the cutoff device 3 when the cutoff condition is met. Therefore, the in-vehicle cutoff current supply device 10 can immediately cause the current supplied from the voltage conversion unit 11 to flow toward the current input unit 7 of the cutoff device 3 when the cutoff condition is met.

Furthermore, the in-vehicle cutoff current supply device 10 can enable the current limiting unit 15 to limit the current flowing from the power supply unit 2 side to the voltage conversion unit 11 side, while allowing current to flow from the power supply unit 2 side to the voltage conversion unit 11 side via the parallel switch 16 when the cutoff condition is met. For this reason, in the in-vehicle cutoff current supply device 10, when the cutoff condition is met, the current input from the power supply unit 2 side to the voltage conversion unit 11 increases, and the current output from the voltage conversion unit 11 to the first conductive path 81 increases.

Therefore, the in-vehicle cutoff current supply device 10 can suppress a decrease in the output voltage of the voltage conversion unit 11 and a reduction in the current flowing to the current input unit 7 when the cutoff condition is met. As a result, the cutoff operation by the cutoff device 3 is performed quickly.

Also, if the parallel switch 16 is kept in the on state before the cutoff condition is met, it becomes necessary to use elements with high current resistance as elements constituting the drive unit 14 and so on, which raises concerns about increasing costs. In contrast, the in-vehicle cutoff current supply device 10 switches the parallel switch 16 to the on state after the cutoff condition is met, and therefore such a problem of increasing costs is unlikely to occur.

If the drive unit 14 and the parallel switch 16 operate based on the results of the cutoff condition determined by separate determination means, issues such as the parallel switch 16 not operating even when the drive unit 14 operates or a timing mismatch between the operations of the drive unit 14 and the parallel switch 16 may occur. In contrast, in the in-vehicle cutoff current supply device 10, the drive unit 14 and the parallel switch 16 both operate in response to the instruction signal from the signal generation unit 13. Therefore, when causing current to flow from the drive unit 14 to the current input unit 7 side in response to the cutoff condition being met, the in-vehicle cutoff current supply device 10 can more reliably switch the parallel switch 16 to the on state and increase the output current from the voltage conversion unit 11.

In the first state, the in-vehicle cutoff current supply device 10 can more reliably limit the current flowing from the power supply unit 2 side to the voltage conversion unit 11 side using the current limiting unit 15. When the cutoff condition is met, the in-vehicle cutoff current supply device 10 can switch the parallel switch 16 to the on state to increase the output current from the voltage conversion unit 11.

In the first state, the in-vehicle cutoff current supply device 10 can suppress the output current from the voltage conversion unit 11 when the current flowing through the current limiting unit 15 exceeds the threshold value. On the other hand, in the second state, the in-vehicle cutoff current supply device 10 does not perform current suppression control even when the current flowing through the current limiting unit 15 exceeds the threshold value, thereby increasing the output current from the voltage conversion unit 11 to enable the cutoff device 3 to perform the cutoff operation quickly.

The in-vehicle cutoff current supply device 10 can cause current to flow from the voltage conversion unit 11 to the capacitor 12 to charge the capacitor 12 in a state before the cutoff condition is met. Thereafter, when the cutoff condition is met, the current from the capacitor 12 flows toward the current input unit 7 via the first conductive path 81 and the drive unit 14. In other words, the in-vehicle cutoff current supply device 10 can quickly cause the cutoff device 3 to perform the cutoff operation with both the current from the capacitor 12 and the current from the voltage conversion unit 11 when the cutoff condition is met. Moreover, since the output current from the voltage conversion unit 11 increases when the cutoff condition is met, the in-vehicle cutoff current supply device 10 can cause the cutoff device 3 to perform the cutoff operation even more quickly.

In the in-vehicle cutoff current supply device 10, the current limiting unit 15 can be constituted by a resistor portion.

In the in-vehicle cutoff current supply device 10, when the cutoff condition is met, the parallel switch 16 switches to the on state and one end of the current limiting unit 15 is short-circuited to the other end. For this reason, when the cutoff condition is met, the in-vehicle cutoff current supply device 10 can sharply increase the current supplied from the power supply unit 2 to the voltage conversion unit 11, and as a result, sharply increase the current supplied to the cutoff device 3.

Note that the in-vehicle cutoff current supply device 10 may be configured so that the cutoff device 3 can perform the cutoff operation with only the current from the capacitor 12. With this configuration, the addition of the current from the voltage conversion unit 11 allows the cutoff device 3 to perform the cutoff operation more quickly. In addition, with this configuration, it is easier to address a decrease in the supplied current due to deterioration of the capacitor 12 or the like.

The in-vehicle cutoff current supply device 10 may also be configured so that the cutoff device 3 can perform the cutoff operation with only the current from the voltage conversion unit 11. With this configuration, the addition of the current from the capacitor 12 allows the cutoff device 3 to perform the cutoff operation more quickly.

Furthermore, the in-vehicle cutoff current supply device 10 may be configured so that the cutoff device 3 does not perform the cutoff operation with only the current from either the capacitor 12 or the voltage conversion unit 11 alone, but the cutoff device 3 can perform the cutoff operation with the current from both the capacitor 12 and the voltage conversion unit 11. With this configuration, it is easier to reduce the capacity of the capacitor 12 compared to a configuration in which the cutoff device 3 can perform the cutoff operation with only the current from the capacitor 12.

Other Embodiments

The present disclosure is not limited to the embodiments described above and illustrated in the drawings. For example, the features of the embodiments described above or below can be combined in any way as long as there is no contradiction. Also, any feature of the embodiments described above or below can be omitted unless explicitly stated as essential. Furthermore, the embodiments described above may be modified as follows.

The first embodiment described above employs a configuration in which only the parallel switch 16 is provided in parallel with the current limiting unit 15. However, as long as the configuration allows current to flow from the power supply unit 2 side to the voltage conversion unit 11 side via the parallel switch 16 when the parallel switch 16 is in the on state, a configuration may be employed in which a structure connecting another element to the parallel switch 16 is provided in parallel with the current limiting unit 15. The other element may be, for example, a resistor portion, a diode, or the like.

In the first embodiment described above, the drive unit 14 and the parallel switch 16 operate based on the result of the determination regarding the cutoff condition by the same determination means (the signal generation unit 13), but they may operate based on the results of the determination regarding the cutoff condition by separate determination means.

In the first embodiment described above, the capacitor may not be provided.

The determination regarding whether or not the cutoff condition is met may be performed inside the in-vehicle cutoff current supply device 10 or outside the in-vehicle cutoff current supply device 10. When the determination regarding whether or not the cutoff condition is met is performed outside the in-vehicle cutoff current supply device 10, the in-vehicle cutoff current supply device 10 can perform the operations in response to the cutoff condition being met by receiving a signal from the outside when it is determined that the cutoff condition is met.

The embodiments disclosed herein should be considered illustrative in all respects and not restrictive. The scope of the present disclosure is not limited to the embodiments disclosed herein, but is indicated by the claims, and it is intended to include all modifications within the meaning and scope equivalent to the claims.

The invention claimed is:

1. An in-vehicle cutoff current supply device that is to be used in an in-vehicle system including a power supply unit and a cutoff device that performs a cutoff operation to interrupt a power path in response to current flowing into a current input unit, the in-vehicle cutoff current supply device causing current supplied from the power supply unit to flow toward the current input unit when a cutoff condition is met, the in-vehicle cutoff current supply device comprising:

a voltage conversion unit that converts a voltage input from the power supply unit side and applies an output voltage between a first conductive path and a second conductive path;

a control unit that performs feedback control to control the voltage conversion unit so that the output voltage matches a target voltage;

a drive unit that causes current supplied from the first conductive path to flow toward the current input unit when the cutoff condition is met;

a current limiting unit that is provided between the power supply unit and the voltage conversion unit and limits current flowing from the power supply unit side to the voltage conversion unit side; and a parallel switch that is provided in parallel with the current limiting unit, wherein the control unit starts the feedback control in a state where the cutoff condition is not met, and when the cutoff condition is met, the parallel switch switches to an on state, and current flows from the power supply unit side to the voltage conversion unit side via the parallel switch.

2. The in-vehicle cutoff current supply device according to claim 1, further including;

a signal generation unit that outputs an instruction signal when the cutoff condition is met, wherein the instruction signal output from the signal generation unit is supplied to the drive unit and the parallel switch, the drive unit supplies the current supplied from the first conductive path toward the current input unit when the instruction signal is supplied, and the parallel switch switches to the on state when the instruction signal is supplied.

3. The in-vehicle cutoff current supply device according to claim 1, wherein when a predetermined start condition is met, the in-vehicle cutoff current supply device enters a first state in which the parallel switch is in an off state and the control unit performs the feedback control, and when the cutoff condition is met in the first state, the in-vehicle cutoff current supply device enters a second state in which the parallel switch is in the on state.

4. The in-vehicle cutoff current supply device according to claim 3, wherein, in the first state, the control unit performs current suppression control to lower the output voltage of the voltage conversion unit when current flowing through the current limiting unit exceeds a threshold value, whereas, in the second state, the control unit does not perform the current suppression control even when the current flowing through the current limiting unit exceeds the threshold value.

5. The in-vehicle cutoff current supply device according to claim 1, further including;

a capacitor with one end electrically connected to the first conductive path and the other end electrically connected to the second conductive path.

6. The in-vehicle cutoff current supply device according to claim 1, wherein the current limiting unit is a resistor portion.

7. The in-vehicle cutoff current supply device according to claim 1, wherein, when the parallel switch is in the on state, both ends of the current limiting unit are short-circuited to each other via the parallel switch.

8. The in-vehicle cutoff current supply device according to claim 2, wherein when a predetermined start condition is met, the in-vehicle cutoff current supply device enters a first state in which the parallel switch is in an off state and the control unit performs the feedback control, and when the cutoff condition is met in the first state, the in-vehicle cutoff current supply device enters a second state in which the parallel switch is in the on state.

9. The in-vehicle cutoff current supply device according to claim 2, further including;

a capacitor with one end electrically connected to the first conductive path and the other end electrically connected to the second conductive path.

10. The in-vehicle cutoff current supply device according to claim 2, wherein the current limiting unit is a resistor portion.

11. The in-vehicle cutoff current supply device according to claim 2, wherein, when the parallel switch is in the on state, both ends of the current limiting unit are short-circuited to each other via the parallel switch.

* * * * *